United States Patent [19]
Michael, III

[11] Patent Number: 4,594,029
[45] Date of Patent: Jun. 10, 1986

[54] METHOD FOR TRIMMING COAXIAL CABLE

[75] Inventor: George W. Michael, III, Harrisburg, Pa.

[73] Assignee: AMP Incorporated, Harrisburg, Pa.

[21] Appl. No.: 665,194

[22] Filed: Oct. 26, 1984

Related U.S. Application Data

[62] Division of Ser. No. 408,959, Aug. 17, 1982, abandoned.

[51] Int. Cl.⁴ .............................................. H02G 1/12
[52] U.S. Cl. .................................. 408/1 R; 30/90.1; 81/9.4; 408/202
[58] Field of Search .................. 81/9.4, 9.41, 9.42, 81/9.43, 9.44; 30/90.1, 90.6–90.8; 408/1, 202

[56] References Cited
U.S. PATENT DOCUMENTS 3,659,483  5/1972  Matthews ........................ 30/90.1 X
4,203,333  5/1980  Campari ............................ 81/9.44
4,317,279  3/1982  Smith et al. ........................ 30/90.1

Primary Examiner—James M. Meister
Attorney, Agent, or Firm—Adrian J. LaRue

[57] ABSTRACT

A tool for trimming coaxial cable comprises a cable-holding member and a cutter-holding member. Sections of the cable-holding member and cutter-holding member are matable for movement relative to each other and they are initially secured together so that stop surfaces of these members are spaced from one another based on the amount of trimming that must be done to trim a cable to a precise electrical length. The end of the cable is secured in the cable-holding member with the end to be trimmed disposed against a cutter member secured to the cutter-holding member. The matable sections are unsecured, the cutter-holding member is rotated relative to the cable-holding member so that the cutter member trims the cable end until the stop surfaces engage.

4 Claims, 7 Drawing Figures

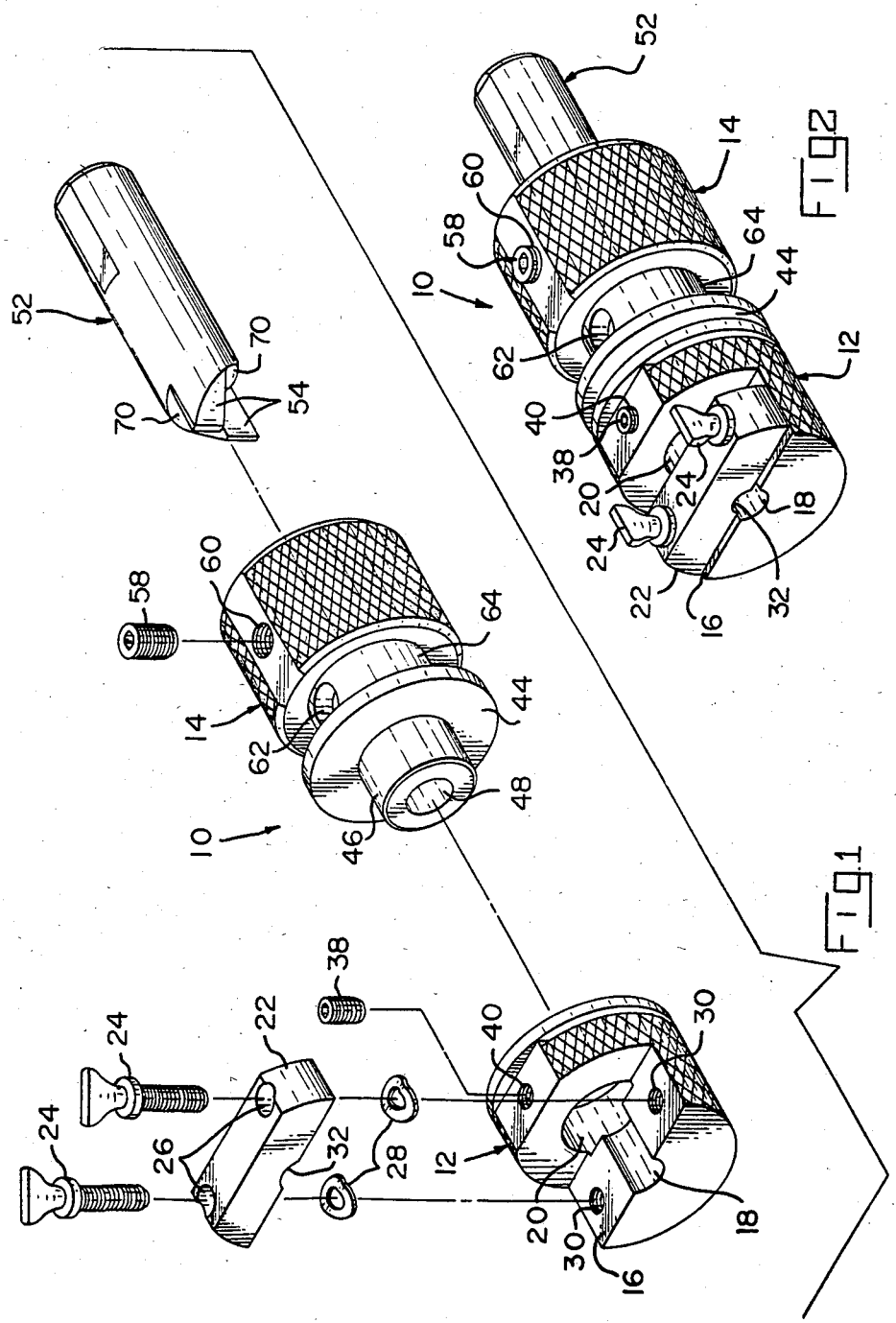

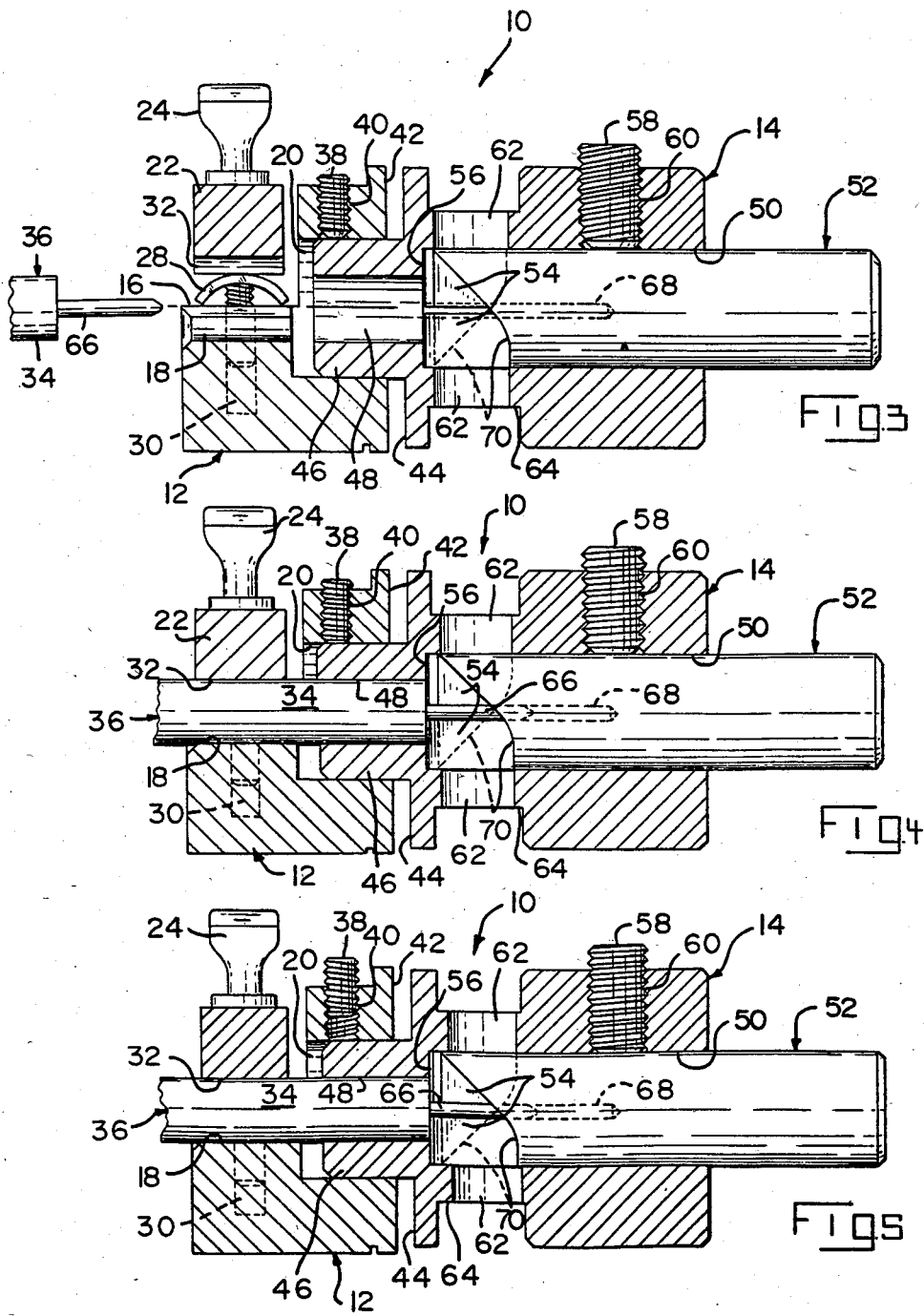

METHOD FOR TRIMMING COAXIAL CABLE

This is a division of application Ser. No. 408,959, filed Aug. 17, 1982, now abandoned.

FIELD OF THE INVENTION

This invention relates to a tool and more particularly to a tool and method for trimming coaxial cable.

BACKGROUND OF THE INVENTION

Radio frequency performance is highly important in many high frequency applications such as, for example, phase array radar equipment. The many coaxial cable lines used in such equipment must have precise lengths so that the phase shift of the signals moving therealong is held to a very tight tolerance.

U.S. patent application Ser. No. 408,958 filed Aug. 17, 1982, now U.S. Pat. No. 4,441,781, the disclosure of which is incorporated herein by reference, describes a method for measuring the electrical lengths of coaxial cables to be terminated prior to the coaxial cables being permanently terminated to make certain the electrical lengths of the cables are correct.

In most cases, the cables have to be trimmed to the precise lengths prior to being permanently terminated.

SUMMARY OF THE INVENTION

According to the present invention, a tool for precisely trimming coaxial cable comprises a cable-holding member and a cutter-holding member. Sections of the cable-holding member and cutter-holding member are matable for movement relative to each other and they are initially secured together so that stop surfaces of these members are spaced from one another based on the amount of trimming that must be done to trim a cable to a precise electrical length. The end of the cable is secured in the cable-holding member with the end to be trimmed disposed against a cutter member secured to the cutter-holding member. The matable sections are unsecured, the cutter-holding member is rotated relative to the cable-holding member so that the cutter member trims the cable end until the stop surfaces engage.

BRIEF DESCRIPTION OF THE DRAWINGS

FIG. 1 is an exploded perspective view of the parts of the coaxial cable trimming tool.

FIG. 2 is a perspective view of the tool in an assembled form.

FIGS. 3 through 6 are cross-sectional views showing the tool in operation trimming the end of a semirigid coaxial cable.

DETAILED DESCRIPTION OF THE PREFERRED EMBODIMENT

Figure 6:
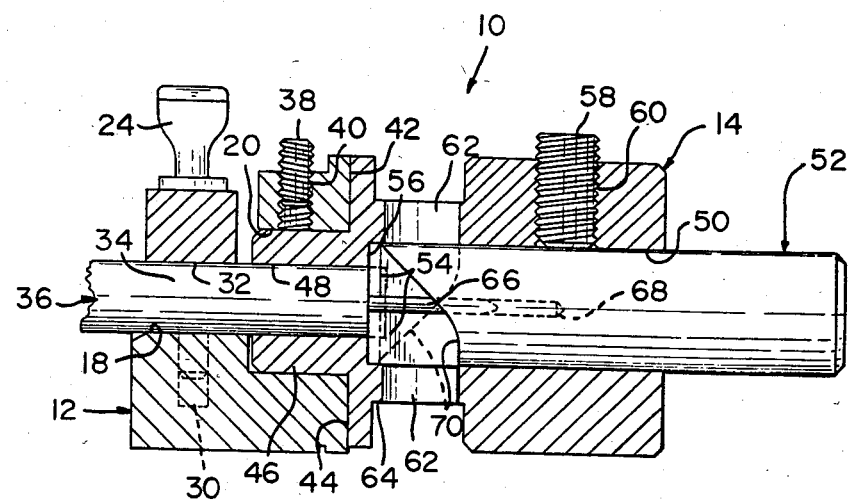

Coaxial cable trimming tool 10 as shown in FIGS. 1 and 2 comprises a cable-holding member 12 and a cutter-holding member 14. Cable-holding member 12 has a flat surface 16 in which is located an arcuate recess 18. A bore 20 is located in member 12 and is in axial alignment and communication with recess 18. Clamping member 22 is maintained in position relative to flat surface 16 by thumbscrews 24 which pass freely through holes 26, spring washers 28, and threadably engage threaded holes 30. An arcuate recess 32 is located is clamping member 22 in opposed alignment with arcuate recess 18. As shown in FIGS. 4 through 6, outer conductor 34 of semirigid coaxial cable 36 is disposed in opposing recesses 18, 32 with clamping member 22 in engagement with outer conductor 34 to clampingly secure coaxial cable 36 in position in cable-holding member 12. A set screw 38 is threadedly disposed in threaded hole 40. Surface 42 is located at the front end of member 12 and defines a stop surface.

Cutter-holding member 14 has a stop surface 44 out of which extends a cylindrical section 46 which is concentric with surface 44 and is matable within bore 20 of cable-holding member 12. Cylindrical section 46 is movable along bore 20 and is secured therein by means of set screw 38 as shown in FIG. 3. Cylindrical section 46 has a bore 48 for receiving coaxial cable 36 therein as shown in FIGS. 4 through 6. Bore 48 is in axial alignment and communication with bore 50 in which is disposed a cutter member 52 having cutter blades 54 that abut against a surface 56 separating bores 48 and 50. A set screw 58 is threadably mounted in threaded hole 60 securing cutter member 52 in bore 50 and against surface 56. Holes 62 extend through reduced section 64 and communicate with bore 50 in alignment with cutter blades 54.

Tool 10 is to be used to trim the end of semirigid coaxial cable 36 for phase-matching purposes when cable 36 has been tested to determine if its electrical length is correct when tested in accordance with the teachings of U.S. patent application Ser. No. 408,958 filed Aug. 17, 1982, now U.S. Pat. No. 4,441,781. The amount that the cable has to be trimmed will be from 0.001 inch to 0.020 inch but it can be larger. After coaxial cable 36 has been tested to determine whether its electrical length is correct or not, and assuming the cable is too long and needs to be trimmed to a precise length, a phase-matching test connector as disclosed in U.S. patent application Ser. No. 408,958, now U.S. Pat. No. 4,441,781 is removed from the end of cable 36 and its end trimmed in accordance with the following procedure.

A determination is made as to how much the cable end must be trimmed so that the cable has the precise electrical length. After set screw 38 has been loosened, a feeler gauge (not shown) is positioned between stop surfaces 42, 44 to position cable-holding member 12 relative to cutter-holder member 14 at a distance determined by the feeler gauge which is representative of the amount of trimming that has to be performed on the end of the cable so that the cable is at its precise length. Set screw 38 is then tightened to secure members 12, 14 at this distance. The end of cable 36 is positioned in recesses 18, 32 and within bore 48 until the end of outer conductor 34 abuts against cutter blades 54 as illustrated in FIG. 4 with center conductor 66 disposed in bore 68 in cutter member 52. Clamping member 22 is clamped tightly onto outer conductor 34 via screws 24. With the end of outer conductor 34 and the dielectric sheathing covering center conductor 66 securely positioned against cutter blades 54, set screw 38 is loosened and cutter-holding member 14 is rotated relative to cable-holding member 12 either manually or by the end of cutter member 52 extending outwardly from cutter-holding member 14 being connected to a driving member such as, for example, an electric drill, cutter blades 54 trim outer conductor 34 and the insulation sheath until stop surfaces 44, 42 engage thereby resulting in cable 36 being trimmed to the desired length. Trimmings of outer conductor 34 and the insulation sheath are expessed from bore 50 by curved surfaces 70 of cutter blades 54 forcing the trimmings out of holes 62. The trimmed end of the cable is removed from cable-holding member 12 by loosening screws 24 to relieve the pressure of clamping member 22, the phase-testing connector is reapplied onto the end of trimmed cable 36 so that the electrical length can be measured to make certain that the cable length is correct and, if it is, the test connector is removed and a coaxial connector is permanently terminated on the trimmed end of the cable.

The diameter of bore 48 in which cable 36 is positioned must be closely related to the diameter of outer conductor 34 to enable the outer conductor to be cleanly trimmed as section 46 moves along conductor 34 while cutter blades 54 trim the metal and insulation from the cable end during operation of the cutter blades. This assures clean trimming of the outer conductor and the insulation sheath.

Figure 7:
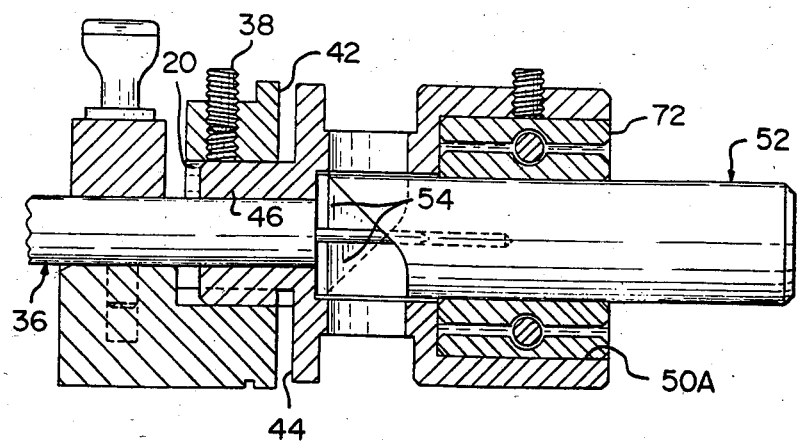
FIG. 7 is a cross-sectional view of an alternative embodiment of the invention.

An alternative embodiment is shown in FIG. 7 with cutter member 52 secured in a bearing 72 that is secured in bore 50A so that cutter member 52 rotates relative to cutter-holding member 14. Cylindrical section 46 will move axially along bore 20 until stop surfaces 42, 44 engage when rotating cutter blades 54 trim the cable end after cable 36 is clamped in position and set screw 38 unsecures section 46 from its position in bore 20. A drill member or the like operates cutter member 52. If desired, section 46 and bore 20 can have a key arrangement so that these members move axially but not rotatively relative to each other.

I claim:

1. A method of trimming an end of a coaxial cable, comprising the steps of:
    positioning sections of a cable-holding member and a cutter-holding member at a distance from one another equal to the amount that is to be trimmed from a cable end;
    securing the cable-holding member and cutter-holding member together;
    clamping the end of the cable to be trimmed in the cable-holding member with the cable end being positioned against cutting blades of a cutter member;
    unsecuring the cable-holding member and cutter-holding member from each other;
    operating the cutter member so that the cutting blades trim the cable end until stop surfaces of the sections engage one another.

2. A method as set forth in claim 1 wherein the cutter-holding member and the cutter member are operated as one unit by rotation.

3. A method as set forth in claim 1 wherein the cutter member is rotated separate from said cutter-holding member.

4. A method as set forth in claim 1 comprising the further step of removing material trimmed from the cable end from the cutting blades.

* * * * *